US006795853B1

United States Patent
Snover

(12) United States Patent
(10) Patent No.: US 6,795,853 B1
(45) Date of Patent: Sep. 21, 2004

(54) INTEGRATION OF ADDITIONAL COMPUTER COMPONENTS INTO A COMPUTER OPERATION THROUGH ATTRIBUTE ENABLED INTERACTIVE SELECTIONS PRESENTED IN COMPOSITE LISTS AVAILABLE TO THE USER IN A VARIETY OF DISPLAY SCREENS

(75) Inventor: Jeffrey Phillip Snover, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 09/108,147

(22) Filed: Jun. 30, 1998

(51) Int. Cl.[7] ............................................... G06F 15/16
(52) U.S. Cl. ...................... 709/220; 709/221; 709/222; 709/226
(58) Field of Search ................................. 709/220, 221, 709/222, 226; 345/326, 440, 349

(56) References Cited

U.S. PATENT DOCUMENTS

| | | | | |
|---|---|---|---|---|
| 5,287,537 A | * | 2/1994 | Newmark et al. | |
| 5,295,244 A | * | 3/1994 | Dev et al. | |
| 5,345,550 A | | 9/1994 | Bloomfield | 395/156 |
| 5,392,386 A | | 2/1995 | Chalas | 395/155 |
| 5,394,522 A | * | 2/1995 | Sanchez-Frank et al. | 345/735 |
| 5,517,645 A | | 5/1996 | Stutz et al. | 395/700 |
| 5,586,255 A | * | 12/1996 | Tanaka et al. | |
| 5,632,022 A | | 5/1997 | Warren et al. | 395/350 |
| 5,774,667 A | * | 6/1998 | Garvey et al. | 709/222 |
| 5,793,983 A | * | 8/1998 | Albert et al. | |
| 5,794,006 A | * | 8/1998 | Sanderman | |
| 5,822,534 A | * | 10/1998 | Yamunachari et al. | |
| 5,832,503 A | * | 11/1998 | Malik et al. | |
| 5,845,078 A | * | 12/1998 | Tezuka et al. | |
| 5,867,713 A | * | 2/1999 | Shrader et al. | |
| 5,913,037 A | * | 6/1999 | Spofford et al. | 709/226 |
| 5,958,012 A | * | 9/1999 | Battat et al. | |
| 5,960,175 A | * | 9/1999 | Grossman et al. | 709/222 |
| 5,978,912 A | * | 11/1999 | Rakavy et al. | |
| RE36,444 E | * | 12/1999 | Sanchez-Frank et al. | 345/349 |
| 6,002,996 A | * | 12/1999 | Burks et al. | |
| 6,018,769 A | * | 1/2000 | Tezuka et al. | 709/220 |
| 6,020,899 A | * | 2/2000 | Long | 345/440 |
| 6,167,449 A | * | 12/2000 | Arnold et al. | 709/227 |

* cited by examiner

*Primary Examiner*—Rupal Dharia
*Assistant Examiner*—Stephan Willett
(74) *Attorney, Agent, or Firm*—Jerry B. Kraft; Jeffrey S. LaBaw

(57) ABSTRACT

A system for the accessing and addition of computing components outside of and consequently non-native to a current computer operation through a user interactive interface which involves predetermining a plurality of computing components to be selectively added to the computer operation, and designating and displaying a plurality of system elements. Means are provided for predetermining at least one invocative attribute for each of said elements and for enabling said selective addition of an associated computing component to said operation responsive to the occurrence of an invocative attribute. A listing of the computing components enabled for the selective addition is displayable for each of the displayed elements, together with means for selecting at least one of the listed enabled computing components to thereby add its associated computing component. This menu listing of those computing components enabled for addition to the current or native ongoing computer operations by the occurrence of invocative attributes relative to the system elements is available for user interaction wherever the element is displayed.

52 Claims, 8 Drawing Sheets

INTEGRATION OF ADDITIONAL COMPUTER COMPONENTS INTO A COMPUTER OPERATION THROUGH ATTRIBUTE ENABLED INTERACTIVE SELECTIONS PRESENTED IN COMPOSITE LISTS AVAILABLE TO THE USER IN A VARIETY OF DISPLAY SCREENS

TECHNICAL FIELD

The present invention relates to interactive computer controlled display systems for adding components to computer operations which are particularly useful in the interactive management of communication networks.

BACKGROUND OF THE INVENTION

The 1990's decade has been marked by a technological revolution driven by the convergence of the data processing industry, the communications industry and the consumer electronics industry. This advance has been even further accelerated by the extensive consumer and business involvement in the Internet over the past few years. It seems as if virtually all aspects of human endeavor in the industrialized world will potentially involve human-computer interfaces; especially such interfaces to communication networks such as the Internet. As a result of these profound changes, there is a need to make computer directed activities accessible to a substantial portion of the world's population which was computer-illiterate or, at best, computer indifferent. In order for the vast computer supported marketplaces to continue and be commercially productive, it will be necessary for a large segment of computer indifferent consumers, workers and business people to be involved in computer interfaces. In addition, because of the vast amount of information potentially available through networks such as the Internet, there has been an increasing demand on the part of relatively sophisticated users for implementations which make display terminal access to the Internet less cluttered and confusing and, of course, easier to use.

In addition, as the need for computer resources and power increases in most technological, business and entertainment fields, such-needs are being met by linked computers which share functions. Such linked computers may be arranged in Local Area Networks (LANs), more extensive Wide Area Networks (WANs) or involve the World Wide Web (Web) or Internet (Net). Whether such networks only involve a server computer with one or two local client computers or several extensive wide area networks linked through the Internet, they must present the user with clear and effective means for sharing and distributing the many and varied computer functions. This involves the accessing and integration of computing components which are outside of and thus non-native to the native or current computer operations whether these be in a native client computer relative to its non-native server computer or computer operations carried out in a LAN relative to a non-native WAN to which the LAN is linkable.

Current user interactive display systems for integrating outside or non-native computer components with current computer operations involve fairly complex display interfaces in which potentially integrable non-native or outside computer functions are presented to the user in a series of fixed or predetermined interactive menus which do not distinguish the non-native computer components from the current or native functions of the computer-operations being carried out. Thus, if a user wishes to access or integrate an outside computer component with respect to a particular element or object in the current or native computer operation, he must first find the representation of such an element on his display, and then bring the element or object into a screen panel containing the fixed menu from which the outside computer component may be selected for the particular element. In addition, before a non-native computing component may be selected for integration for a particular element in a computer operation, it is necessary that a predetermined attribute exist for that element so as to enable such a selection. It is often not very clear from the present fixed menu selection approach whether the selection of a particular computing component for a particular element has been enabled.

SUMMARY OF THE INVENTION

The present invention relates to accessing and adding computing components outside of and, consequently, non-native to a current computer operation through a new interactive interface which is more user friendly and better organized than the above-described interfaces. The present invention involves predetermining a plurality of computing components to be selectively added to the computer operation, and designating and displaying a plurality of system elements. The invention then provides means for predetermining at least one invocative attribute for each of said elements and means responsive to the occurrence of an invocative attribute for enabling said selective addition of an associated computing component to said operation. Means are provided for displaying a listing of the computing components enabled for the selective addition for each of the displayed elements, together with means for selecting at least one of the listed enabled computing components to thereby add its associated computing component.

The primary advantage of the invention is that a menu or listing of those computing components enabled for addition to the current or native ongoing computer operations by the occurrence of invocative attributes relative to the system elements is available for user interaction wherever the element is displayed instead of the prior art procedure of moving the element to the display panel or screen where a fixed menu may be found which will list the particular enabled computing component of interest along with components of the current or native computer operations.

The system elements, with respect to which the computing components are enabled, are usually associated with nodes in the computing system or they may be considered as the nodes themselves. However, in object oriented systems this approach may be used for the combination of objects in object oriented computer operations. In such a case, the elements would be the objects already incorporated into the existing or native system, and the computing components to be added or integrated would be other or non-native objects. Then the occurrence of invocative attributes relative to the native objects would enable the selective integration of a non-native object. Such non-native objects enabled for integration would be displayable in a listing for the native object with which they were integratable.

The computing components integrated or added may be application programs or access to databases or libraries.

The means for displaying the plurality of system elements could display in association with each element, the status of the invocative attributes for the respective element and the means for displaying the elements and invocative attribute status could be in the form of a displayed table.

The present invention is advantageously applicable to computer managed communication networks with user access via a plurality of data processor controlled interactive display stations, and including a plurality of network elements, each respectively associated with one of a plurality of linked network nodes. In networks, the present invention provides a system for accessing computing components comprising means for predetermining a plurality of such computing components to be selectively accessed and means for displaying said plurality of network elements, such as nodes or elements at such nodes. Means are provided for predetermining at least one invocative attribute for each of said elements or nodes together with means responsive to the occurrence of an invocative attribute for enabling said selective accessing of an associated computing component. In the network system, there is also provided means for displaying a listing of said computing components enabled for said selective accessing for each of said displayed elements, and means for selecting at least one of said listed enabled computing components to thereby access said associated computing component.

The network involved may, of course, be the Internet or the Web. In such a case, one the computing components enabled for access could be a Web or Internet browser for linking to various stations on the Internet.

In summary, the present invention provides an interactive computer controlled display, a system for adding computing components to a computer operation comprising means for predetermining a plurality of computing components to be selectively added to said operation, means for predetermining an invocative attribute in the computer operation for enabling said selective addition of one of said plurality of computing components associated with said attribute to said operation, means for displaying a listing of said computing components enabled for said selective addition and means for selecting at least one of said listed enabled computing components to thereby add said associated computing component.

DETAILED DESCRIPTION OF THE PREFERRED EMBODIMENT

Figure 1:
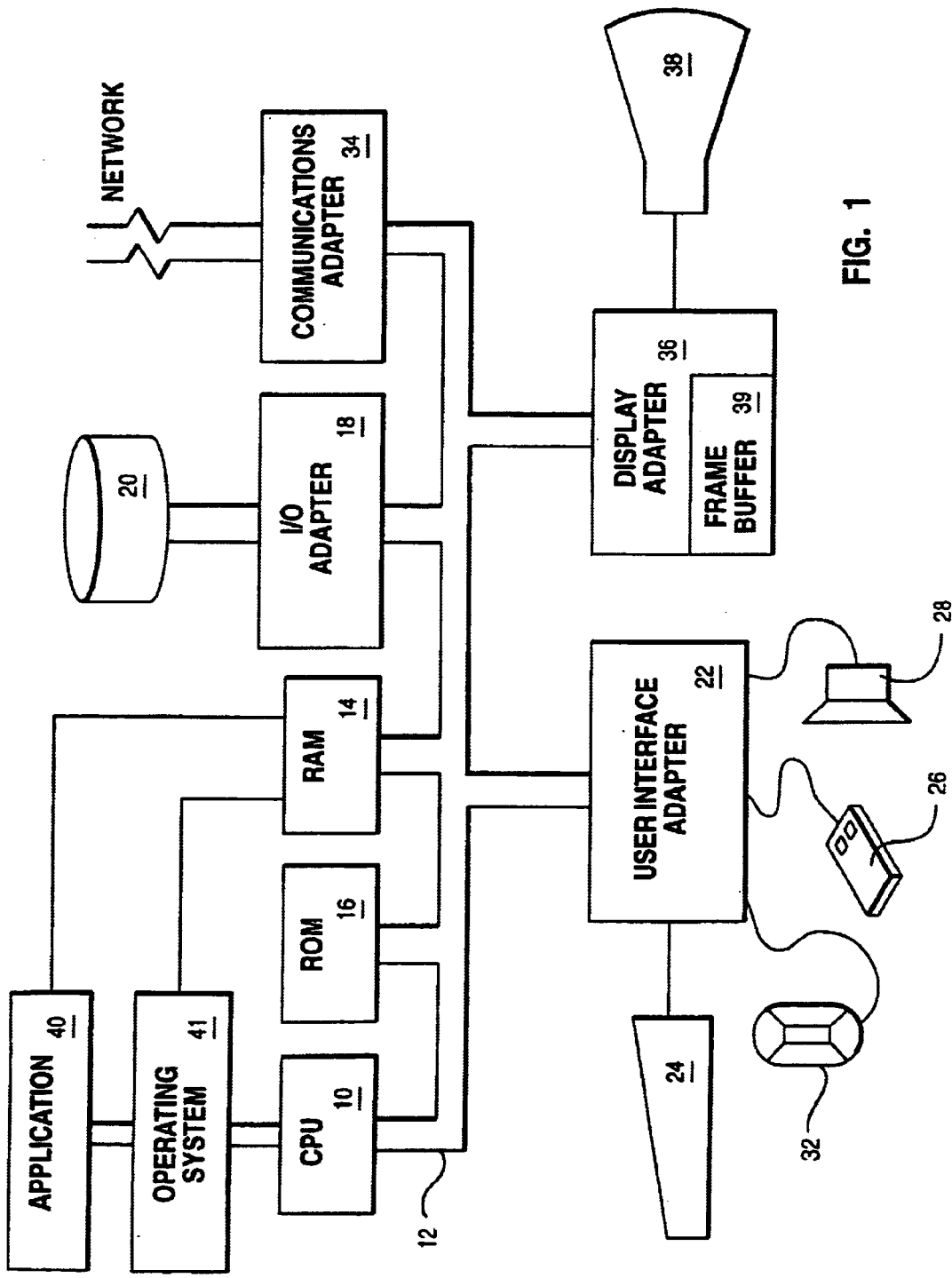
FIG. 1 is a block diagram of a data processing system including a central processing unit which is capable of implementing the interactive display of the present invention.

Referring to FIG. 1, a typical data processing system is shown which may function as the computer controlled display terminal used in implementing the system of the present invention by controlling the adding and integration of computing components into native computer operations being carried out under the control of the computer of FIG. 1. A central processing unit (CPU) 10, such as one of the PC microprocessors available from International Business Machines Corporation, is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation); Microsoft's Windows 95™ or Windows NT™, as well as UNIX or AIX operating systems. A programming application for monitoring and controlling the interactive addition of computing components to current computer operations, application 40, to be subsequently described in detail, runs in conjunction with operating system 41 and provides output calls to the operating system 41 which implement the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes, of course, the Internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the transient displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means through which the user will interface with the system.

In the implementation of the invention, it is frequently the case that additional computing components are added through communication with other nodes within a network. The display terminal of FIG. 1 communicates with the network through the communications adapter 34. Since most of the aspects of the present invention involve access of computing components via networks, some background with respect to networks. would be appropriate at this point. We will not go into great detail in describing the networks to which the present invention is applicable. U.S. Pat. Nos. 5,295,244, Dev et al., and 5,353,399, Kuwamoto et al., adequately detail conventional networks to which the present invention would be applicable, including appropriate network management and display terminal access to such networks. Reference has also been made to the applicability of the present invention to a global network such as the Internet. For details on Internet nodes, objects and links, reference is made to the text, *Mastering the Internet*, G. H. Cady et al., published by Sybex Inc., Alameda, Calif., 1996.

Any data communication system which interconnects or links computer controlled systems or network elements at various sites or network nodes defines a communications network. A network may be as simple as two linked computers or it may be any combination of LANS or WANS. Of course, the Internet is a global network of a heterogeneous mix of computer technologies and operating systems. At each level in a network hierarchy, the unit may be considered as a network element. For example, since the Internet connects networks of computers, a particular corporate network could be a Internet element. Then, the particular LAN of each department in the corporate network would be an object. At high levels, regional networks representative of cities could be elements. Likewise, computer controlled elements could be objects linked together by function to form networks which in turn could be linked into the Internet backbone as network objects characterized by functions as accounts receivable/payable or video-on-demand distribution. Higher level elements are linked to the lower level elements in the hierarchy through a variety of network server computers. For example, a video-on-demand distribution network could comprise several video server repository sites, each having its unique collection of stored films; each of the sites would be network objects and the video distribution network itself would be an element or object on the Internet. Of course, at each level in the hierarchy, each element is associated with its own node.

Figure 2:
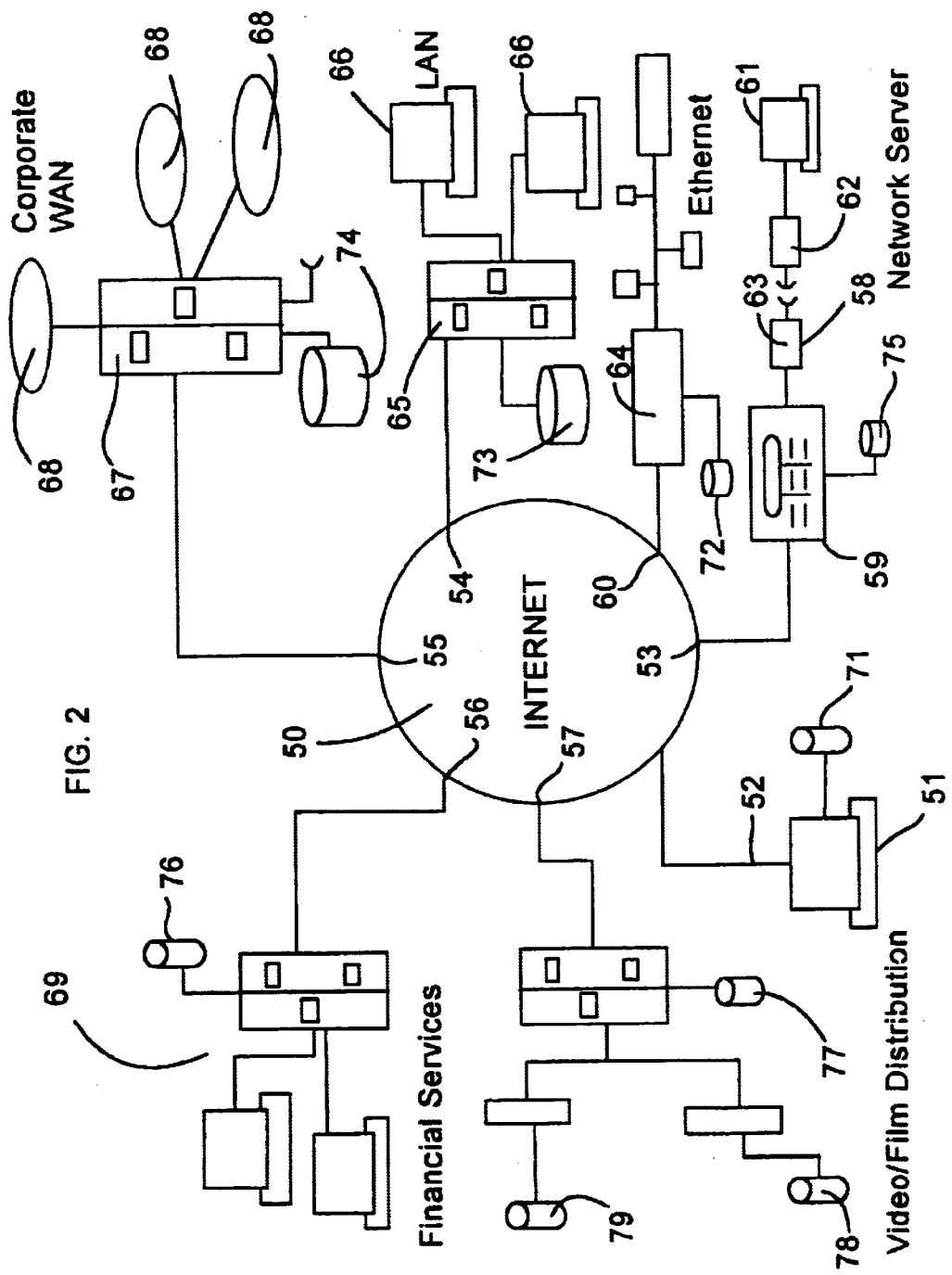
FIG. 2 is a generalized diagrammatic view of an Internet portion upon which the present invention may be implemented.

As a very general example of network arrangements of elements to which a variety of computing components may be added in accordance with the present invention, reference is made to FIG. 2, which is a generalized diagram of a portion of the Internet to which the computer controlled display terminal 51 may be used, for example, to control the addition of computing components not native to the operations controlled by computer terminal 51. Terminal 51 is the computer system shown in FIG. 1 and connection 52 (FIG. 2) is the network connection shown in FIG. 1. Some typical major elements connected to the Internet are user network 58 connected through server 59 at node 53. In such a server network, the individual users' workstations 61 are connected through telephone modems 62 and 63 to the server 59. Of course, at the next level, each of the user workstations 61 may be considered as network elements. Among the other illustrative network elements are ethernet 64 at node 60 and a LAN at node 54 consisting of server 65 and workstation 66. At node 55, the connected element is a corporate WAN consisting of network server 67 and subnetworks 68. In addition, functional networks, such as financial services network 69 and video/film distribution network 70, may be considered as objects, respectively connected at nodes 56 and 57. It should be noted that a variety of databases, 71 through 79, are shown respectively associated with network elements at various levels. These databases represent the various locations and repositories from which libraries may be accessed and data obtained, particularly in processes wherein adding a computing component involves accessing a database or library.

There will now be described a simple illustration of the present invention with respect to the display screens of FIGS. 3 through 7. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. The display screens of FIGS. 3 through 7 are presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38.

Figure 3:
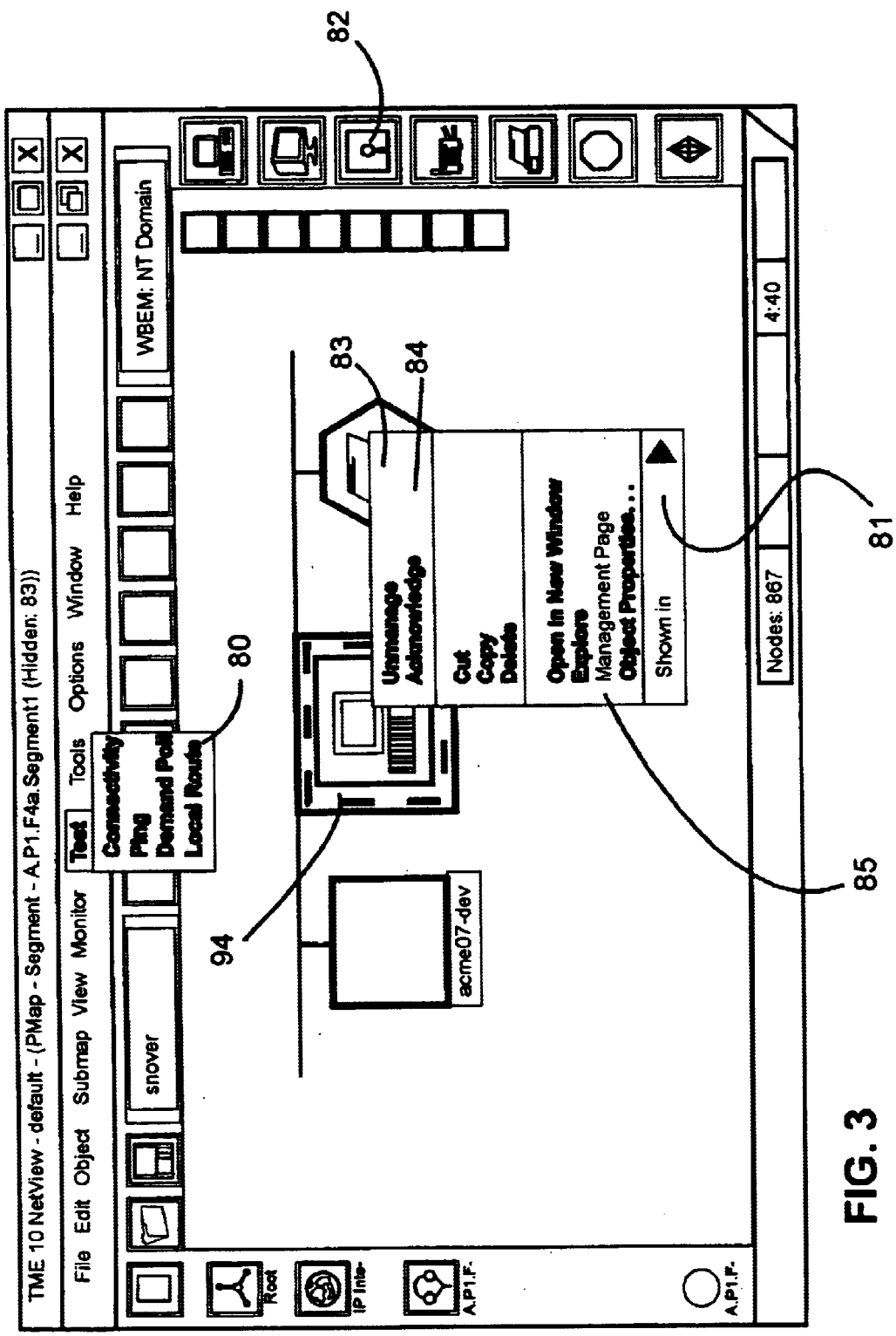
FIG. 3 is a diagrammatic view of a display screen illustrating an interactive prior art interface for adding non-native computing components to current computer operations.

The initial display screen of FIG. 3 shows a typical prior art display screen accessing or adding computer components outside of the current or native environment to the current computer operations. The user wishes to add some of the computer components available or enabled for such selective addition. The first step he must do is to locate the display representation of the element or object in his current operations to which he wishes to apply this additional computer component. In the present example, the element is represented by element 94. He must then move element 94 to the appropriate display screen or panel where fixed menus from which the outside computer component may be selected for the particular element are established. Those are menus from a menu bar like menu 80, pop-up menu 81 and toolbar 82. Also, as mentioned above, before a non-native computing component may be selected for integration for a particular element in a computer operation, it is necessary that a predetermined attribute exist for that element so as to enable such a selection. It should be noted that the computing components which may be added are spread over several— in this example three—menus: "Ping, Demand Poll and Locate Route" in menu 80 or "Unmanage, Acknowledge and Management Page" in menu 81. Also, there may be entries for adding computing components in the toolbar 82. It is often not very clear from the prior art fixed menu selection approach, whether the selection of a particular computing component for a particular element has been enabled. It may have been the case that when the user first located element 94 it was not clear which of its potential computing components for addition may have been enabled by the occurrence of the invocative attribute for that element. It was only after element 94 was brought into the fixed menu environment of FIG. 3 and menus 80, 81 and 82 brought up that the user was able to see which computing components were thus enabled. In menus 80 and 81, it should be noted that all of the above-mentioned computing components are enabled as indicated by their boldface print appearance except "Management Page" which appears in faded print to indicate that it has not been enabled.

Figure 4:
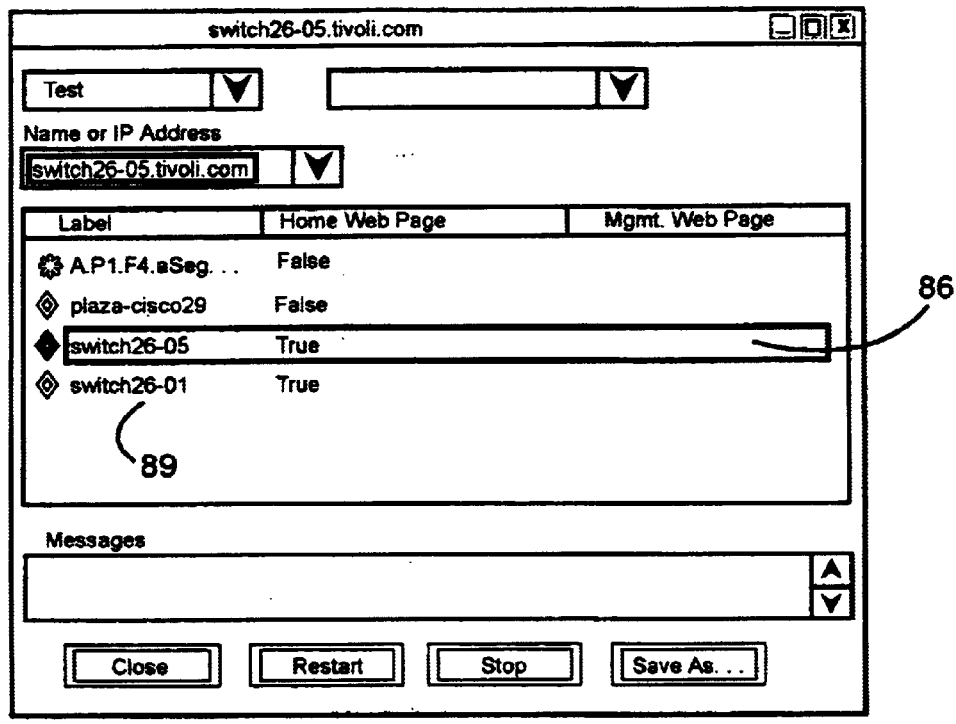
FIG. 4 is a diagrammatic view of a display screen on which elements involved in current computer operations are listed together with the status of invocative attributes associated with such elements.
Figure 5:
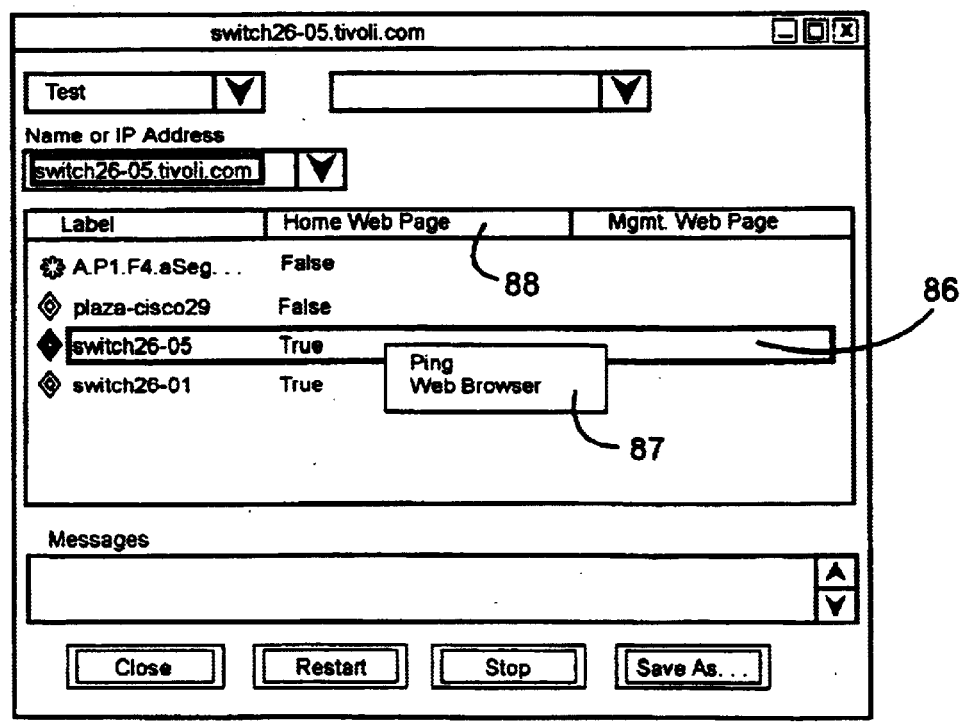
FIG. 5 is the display screen of FIG. 4 in which a listing of computing components enabled for selective addition relative to one of the elements has been brought up.
Figure 6:
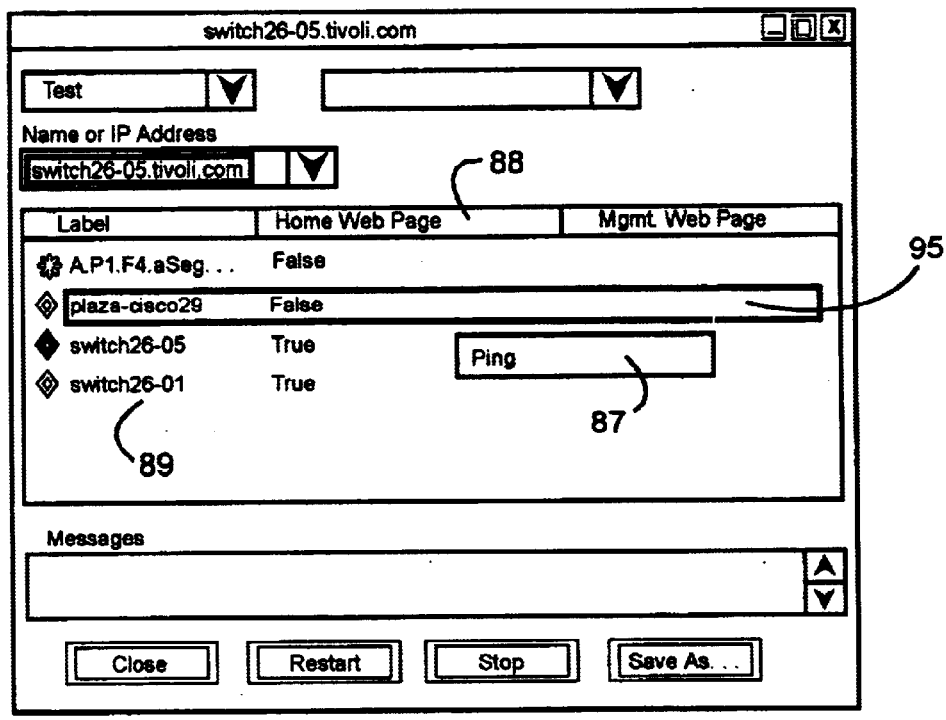
FIG. 6 is the display screen of FIG. 5 but with a list of enabled computing components for a different one of said listed elements.

Now with respect to FIGS. 4 and 5, an illustrative example of the present invention will be given. In the table shown on the screen, there is a listing of four elements 89; these are nodes on a network or the elements at these nodes. For simplicity in illustration, let us assume that we are dealing with two invocative attributes for each element: an IP address and a home web page. Thus, for each element, the expression to permit invocation or enablement of the computing component for addition would be the existence of an IP address and the existence of a home web page. Considering first, element 86 on the table, like all of the other elements or nodes on the list, it inherently must have an IP address because it is a node on the Internet. As for the home web page, an entry of "True" in column 88 indicates that it has one. Thus, it has both invocative attributes. Then, as shown in FIG. 5, when the menu 87 of computing components enabled for selective addition is brought up by any standard means, e.g. by clicking on the right mouse button, it shows two computing components enabled for addition: "Ping" and "Web Browser". Ping is part of a test routine for any network node; since element 86 has a network node, it may be subjected to the Ping test routine. Also, the system has been set up to require the presence of a home Web page in order to make the Web browser computing component available. Thus, menu 87 shows that the web browser has been enabled for selection relative to element 86. The user may then select Ping and/or Web Browser, as appropriate, from menu 87. Referring now to element 95 in the same element menu as shown in FIG. 6, it does not have a Web page as indicated by a reading of "False" in column 88. Thus, the Web browser computing component is not enabled for it and when the user brings up menu 87 for element 95, only the "Ping" test routine is enabled for selection.

Figure 7:
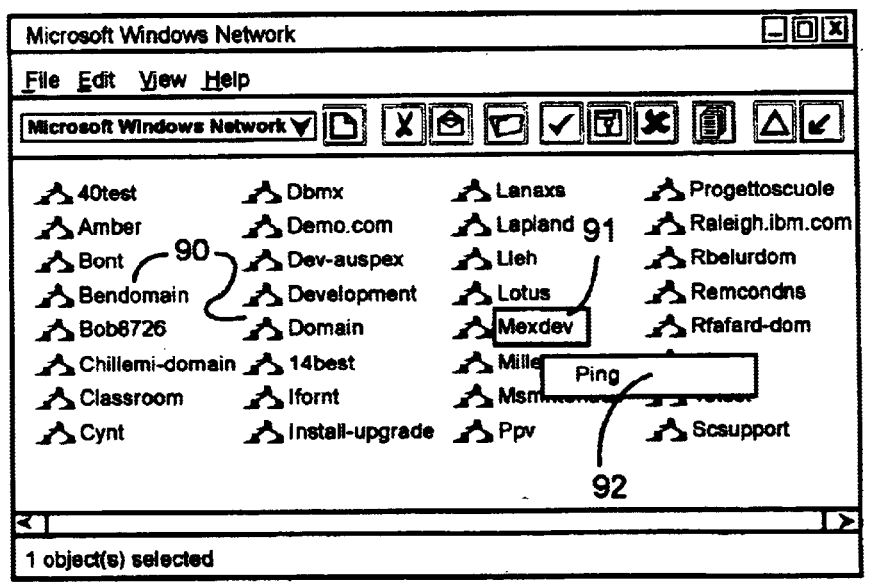
FIG. 7 is a display screen like that of FIG. 5 but with the illustrated listed elements forming a network.

Just to illustrate the applicability of the present invention to other networking environments, FIG. 7 shows a list 90 of the elements which may be displayed for a Microsoft Windows Network using the Network Explorer™ which display and navigates nodes. If a menu 92 of enabled computing components would be brought up, then the only component that would be on the menu would be "Ping" because its nodes are inherently IP nodes. At this initial point, we do not have any additional information regarding the set up the network with respect to the invocative attributes which may enable a variety of computing components for addition to the elements in the native environment. FIG. 7 merely illustrates how the present invention would be applicable to such an environment.

While we have given a few examples of computing components which may be accessed by, added or integrated into native computer operations through enablement resulting from the presence of an invocative attribute, it will be understood by those skilled in the art that there are an extensive variety of such computing elements and available invocative attributes. For example, a GUI error attribute may enable the addition of a GUI Help computing component, or a user input indicating the absence of essential data could be the attribute which enables access to appropriate libraries and databases where such data would be available. The present invention is not limited to the nature of either of the computing elements to be added or the invocative attributes. Rather it relates to the interactive interface for presenting this data to the user.

Figure 8:
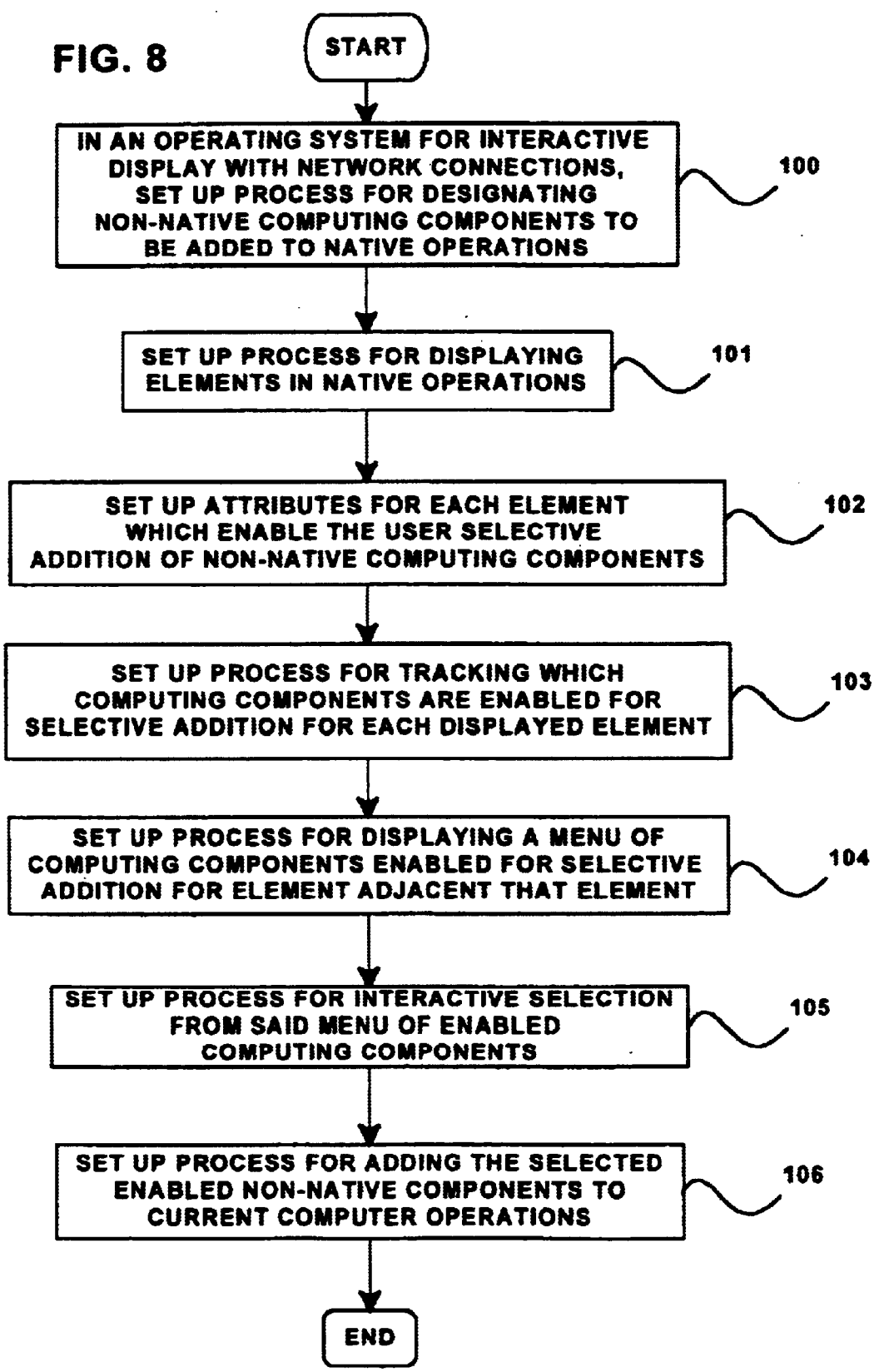
FIG. 8 is a flowchart showing the development of a program of the present invention for adding computer components.
Figure 9:
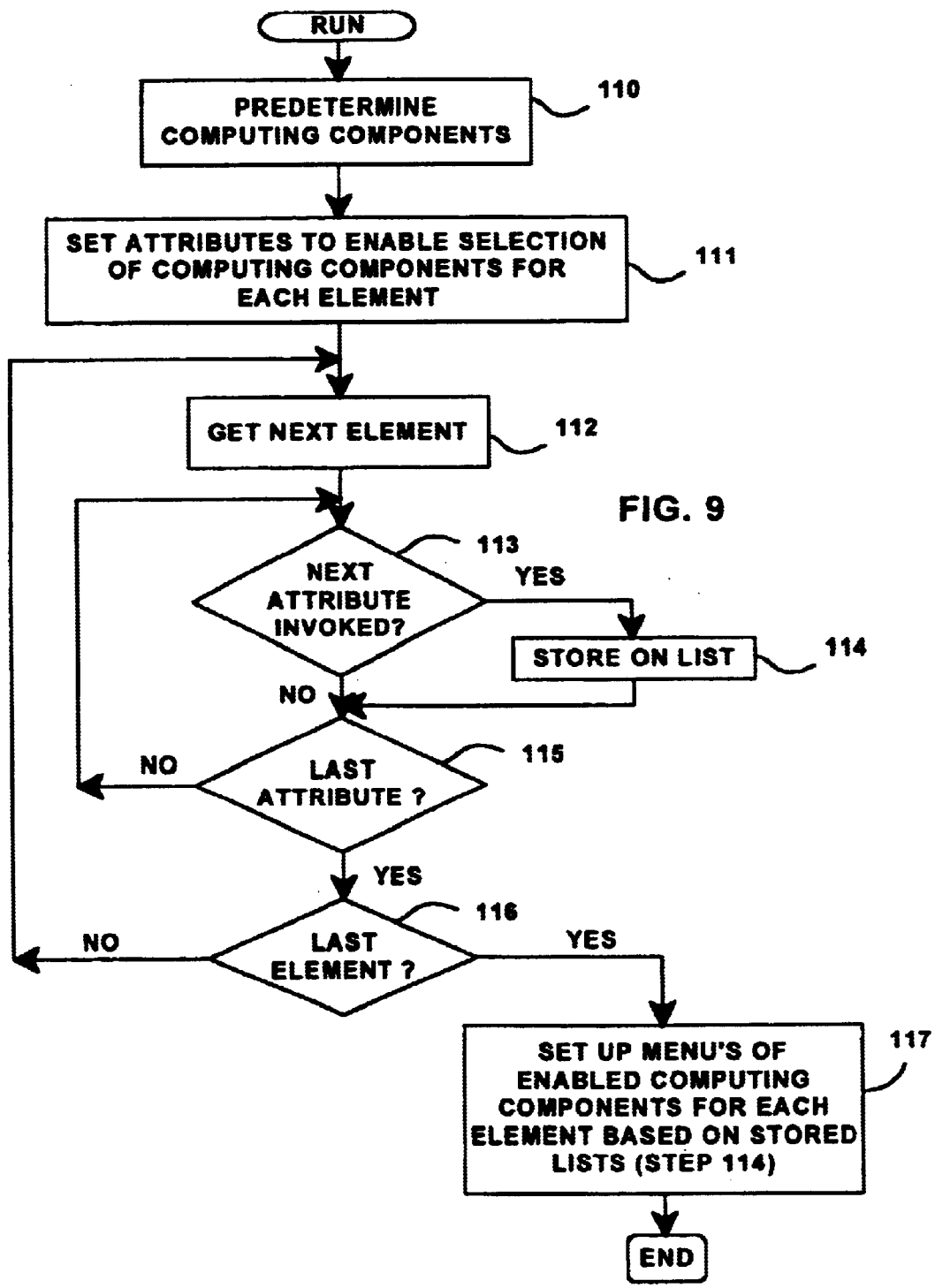
FIG. 9 is a flowchart showing the running of the program described with respect to FIG. 8.
Figure 10:
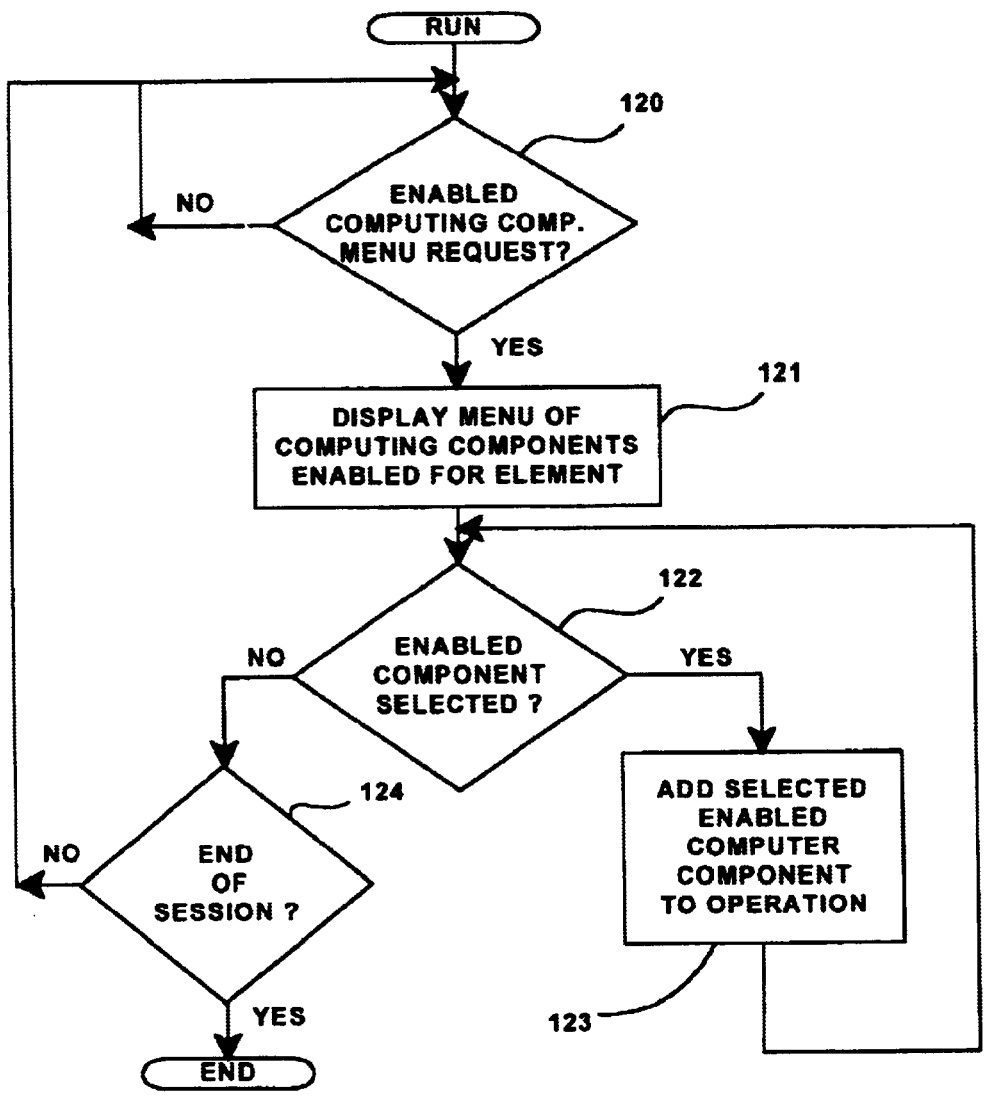
FIG. 10 is also a flowchart showing the running of the program described with respect to FIG. 8.

Now with reference to FIGS. 8, 9 and 10, we will describe a process implemented by the present invention in conjunction with the flowcharts of these figures. FIG. 8 is a flowchart showing the development of a display process according to the present invention for adding computer components to native computer operations. FIGS. 9 and 10 are flowcharts showing the running of the process described with respect to FIG. 8.

With reference to FIG. 8, first, process step 100, in developing the program, in a computer operation on an interactive display with network connections, the non-native computing components which may be accessed and added to the operations are determined and set up. Then the display should be set up to show the element in the current or native computer operations, step 101. Then, step 102, the invocative attributes are determined which will enable the addition of the computing components set up in step 100. Then, step 103, a process must be set up for keeping track of the computing components enabled for selective addition to each of the displayed elements. A process is set up for displaying for each element, a menu of the computing components enabled for selective addition with respect to that element, step 104. A process is then set up, step 105, permitting the interactive user selection of enabled computing components from the menu of step 104. Finally, a process is provided for adding the selected computing component to the current computer operations, step 106.

The running of the process will now be described with respect to FIGS. 9 and 10. First, the computing components which may be added are predetermined, step 110. Then the attributes which will enable the selective addition of the computing components of step 110 are set for each element, step 111. Now, step 112, the initial or next element is considered. A determination is made, decision step 113, as to whether the next attribute has been invoked. If Yes, it is stored on a list for the particular element, step 114. After step 114 or if the decision from step 113 is No, a determination is made, step 115, as to whether the last attribute for that element has been considered. If No, then the flow is returned to step 113, and the next attribute is considered. If Yes, then the process proceeds to decision step 116 where a determination is made as to whether the last element has been reviewed. If No, then the process returns to step 112 and the next element is obtained for consideration. If Yes, then 117, a menu of computing components enabled for selectable addition is set for each of the elements, e.g. menu 87, FIG. 5, which will be pulled up by the user adjacent to each element, this portion of the process ends and we proceed to run the process of FIG. 10.

In the FIG. 10 run an initial determination is made in decision step 120 as to whether there is any request for the menus compiled in step 117 of FIG. 9 for the computing components enabled for selective addition for any element. If Yes, then the appropriate menu is displayed adjacent to the element, step 121. If No, the process is returned to step 120 and a request is monitored for. After the display of the menu of step 121 a determination is made, step 122, as to whether an enabled computing component has been selected from the menu for addition. If Yes, then the selected computing component is added to the current computer operations, step 123, and the system is returned to step 122 and a further determination is made as to whether another component has been selected. If No, then a determination is made, step 124, as to whether the session is over. If Yes, the session is ended. If No, then the process is returned to initial step 120 and a determination is made as to whether there is any further request for a menu of computing components enabled for selective addition.

One of the preferred implementations of the present invention is as an application program 40 made up of programming steps or instructions resident in RAM 14, FIG. 1, during computer operations. Until required by the computer system, the program instructions may be stored in another readable medium, e.g, in disk drive 20, or in a removable memory such an optical disk for use in a CD-ROM computer input, or in a floppy disk for use in a floppy disk drive computer input. Further the program instructions may be stored in the memory of another computer prior to use in system of the present invention and transmitted over a local area network or a wide area network such as the Internet when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In an interactive computer controlled display, a system for adding computing components to a computer operation comprising:

means for predetermining a plurality of computing components to be selectively added to said operation, means for displaying a plurality of system elements, means for predetermining at least one invocative attribute for each of said elements, means responsive to the occurrence of an invocative attribute for enabling said selective addition of an associated computing component to said operation, means for displaying a listing of said computing components enabled for said selective addition for each of said displayed elements, and means for selecting at least one of said listed enabled computing components to thereby add said associated computing component.

2. The system of claim 1 wherein said computing component is an application program.

3. The system of claim 1 wherein said computing component involves access to a database.

4. The system of claim 1 wherein said computing component is an object oriented programming component.

5. The system of claim 4 wherein said computer operation is an object oriented program operation.

6. The system of claim 1 wherein said means for displaying said plurality of system elements display in association with each element, the status of the invocative attributes for the respective element.

7. The system of claim 6 wherein said means for displaying said elements and invocative attribute status is in the form of a displayed table.

8. In a computer managed communication network with user access via a plurality of data processor controlled interactive display stations, and including a plurality of network elements, each respectively associated with one of a plurality of linked network nodes, a system for accessing computing components comprising:

means for predetermining a plurality of computing components to be selectively accessed, means for displaying said plurality of network elements, means for predetermining at least one invocative attribute for each of said elements, means responsive to the occurrence of an invocative attribute for enabling said selective accessing of an associated computing component, means for displaying a listing of said computing components enabled for said selective accessing for each of said displayed elements, and means for selecting at least one of said listed enabled computing components to thereby access said associated computing component.

9. The network system of claim 8 wherein said computing component is an application program.

10. The network system of claim 8 wherein said computing component involves access to a database.

11. The network system of claim 8 wherein said computing component is an object oriented programming component.

12. The network system of claim 8 wherein said computing component is at a particular node in said network, and said means for accessing said component accesses said particular node.

13. The network system of claim 12 wherein said network is the Internet, and said means for accessing includes an Internet browser means.

14. The network system of claim 8 wherein said means for displaying said plurality of network elements display in association with each element, the status of the invocative attributes for the respective element.

15. The network system of claim 14 wherein said means for displaying said elements and invocative attribute status is in the form of a displayed table.

16. In an interactive computer controlled display system, a method for adding computing components to a computer operation comprising:

predetermining a plurality of computing components to be selectively added to said computer operation, displaying a plurality of system elements, predetermining at least one invocative attribute for each of said elements, enabling the selective addition of an associated computing component to said computer operation in response to the occurrence of an invocative attribute, displaying a listing of said computing components enabled for said selective addition for each of said displayed elements, and selecting at least one of said listed enabled computing components to thereby add said associated computing component.

17. The method of claim 16 wherein said computing component is an application program.

18. The method of claim 16 wherein said computing component accesses a database.

19. The method of claim 16 wherein said computing component is an object oriented programming component.

20. The method of claim 19 wherein said computer operation is an object oriented programming operation.

21. The method of claim 16 wherein there is displayed in association with each element in said plurality of system elements, the status of the invocative attributes for the respective element.

22. The method of claim 21 wherein said elements and invocative attribute status are displayed in the form of a table.

23. In a computer managed communication network with user access via a plurality of data processor controlled interactive display stations, and including a plurality of network elements, each respectively associated with one of a plurality of linked network nodes, a method for accessing computing components comprising:

predetermining a plurality of computing components to be selectively accessed, displaying said plurality of network elements, predetermining at least one invocative attribute for each of said elements, enabling the selective addition of an associated computing component to said program in response to the occurrence of an invocative attribute, displaying a listing of said computing components enabled for said selective accessing for each of said displayed elements, and selecting at least one of said listed enabled computing components to thereby access said associated computing component.

24. The method of claim 23 wherein said computing component is an application program.

25. The method of claim 23 wherein said computing component involves access to a database.

26. The method of claim 23 wherein said computing component is an object oriented programming component.

27. The method of claim 23 wherein said computing component is at a particular node in said network and is accessed by accessing said particular node.

28. The method of claim 27 wherein said network is the Internet, and said accessing is implemented by an Internet browser program.

29. The method of claim 23 wherein there is displayed in association with each element in said plurality of system elements, the status of the invocative attributes for the respective element.

30. The method of claim 29 wherein said elements and invocative attribute status are displayed in the form of a table.

31. In an interactive computer controlled display system, a computer program having program code included on a computer readable medium for adding computing components to a computer operation comprising:

means for predetermining a plurality of computing components to be selectively added to said operation, means for displaying a plurality of system elements, means for predetermining at least one invocative attribute for each of said elements, means responsive to the occurrence of an invocative attribute for enabling said selective addition of an associated computing component to said operation, means for displaying a listing of said computing components enabled for said selective addition for each of said displayed elements, and means for selecting at least one of said listed enabled computing components to thereby add said associated computing component.

32. The computer program of claim 31 wherein said computing component is an application program.

33. The computer program of claim 31 wherein said computing component involves access to a database.

34. The computer program of claim 31 wherein said computing component is an object oriented programming component.

35. The computer program of claim 34 wherein said computer operation is an object oriented programming operation.

36. The computer program of claim 31 wherein said means for displaying said plurality of system elements display in association with each element, the status of the invocative attributes for the respective element.

37. The computer program of claim 36 wherein said means for displaying said elements and invocative attribute status is in the form of a displayed table.

38. A computer program for a computer managed communication network with user interactive access via a plurality of data processor controlled display stations and including a plurality of network elements, each respectively associated with one of a plurality of linked network nodes, said program having program code included on a computer readable medium comprising:

means for predetermining a plurality of computing components to be selectively accessed, means for displaying said plurality of network elements, means for predetermining at least one invocative attribute for each of said elements, means responsive to the occurrence of an invocative attribute for enabling said selective accessing of an associated computing component, means for displaying a listing of said computing components enabled for said selective accessing for each of said displayed elements, and means for selecting at least one of said listed enabled computing components to thereby access said associated computing component.

39. The computer program of claim 38 wherein said computing component is an application program.

40. The computer program of claim 38 wherein said computing component involves access to a database.

41. The computer program of claim 38 wherein said computing component is an object oriented programming component.

42. The computer program of claim 38 wherein said computing component is at a particular node in said network, and said means for accessing said component accesses said particular node.

43. The network system of claim 42 wherein said network is the Internet, and said means for accessing includes an Internet browser means.

44. In an interactive computer controlled display, a system for adding computing components to a computer operation comprising:

means for predetermining a plurality of computing components to be selectively added to said operation, means for predetermining an invocative attribute in the computer operation for enabling said selective addition of one of said plurality of computing components associated with said attribute to said operation, means for displaying a listing of said computing components enabled for said selective addition, and means for selecting at least one of said listed enabled computing components to thereby add said associated computing component.

45. The system of claim 44 wherein said computing components are non-native to said computer operation.

46. The system of claim 45 wherein said computing components are added to the computer operation through linking.

47. In an interactive computer controlled display system, a method for adding computing components to a computer operation comprising:

predetermining a plurality of computing components to be selectively added to said operation, predetermining an invocative attribute in the computer operation for enabling said selective addition of one of said plurality of computing components associated with said attribute to said operation, displaying a listing of said computing components enabled for said selective addition, and selecting at least one of said listed enabled computing components to thereby add said associated computing component.

48. The method of claim 47 wherein said computing components are non-native to said computer operation.

49. The system of claim 47 wherein said computing components are added to the computer operation through linking.

50. In an interactive computer controlled display system, a computer program having program code included on a computer readable medium for adding computing components to a computer operation comprising:

means for predetermining a plurality of computing components to be selectively added to said operation, means for predetermining an invocative attribute in the computer operation for enabling said selective addition of one of said plurality of computing components associated with said attribute to said operation, means for displaying a listing of said computing components enabled for said selective addition, and means for selecting at least one of said listed enabled computing components to thereby add said associated computing component.

51. The system of claim 50 wherein said computing components are non-native to said computer operation.

52. The system of claim 50 wherein said computing components are added to the computer operation through linking.

\* \* \* \* \*